United States Patent

Nakazato et al.

[11] Patent Number: 6,034,792
[45] Date of Patent: *Mar. 7, 2000

[54] IMAGE READING DEVICE HAVING TWO DOCUMENT SETTING SECTIONS

[75] Inventors: Yasushi Nakazato, Tokyo; Takashi Taruki, Hiratsuka; Makoto Tanaka, Kamakura; Masashi Kohchi, Tokyo; Hisayo Ohshita, Kawasaki, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/602,028

[22] Filed: Feb. 15, 1996

[30] Foreign Application Priority Data

Feb. 16, 1995 [JP] Japan .................................. 7-28435

[51] Int. Cl.[7] ............................. H04N 1/04; G06K 9/22
[52] U.S. Cl. ......................... 358/497; 358/498; 358/474; 382/315
[58] Field of Search ................................. 358/498, 496, 358/497, 296, 474, 475, 480, 487, 491, 437, 302; 355/408, 407, 97, 99; 250/559.06, 208.1; 359/212; 382/312, 315, 317, 318

[56] References Cited

U.S. PATENT DOCUMENTS

| 4,264,188 | 4/1981 | Tomosada et al. | 355/14 R |
|---|---|---|---|
| 4,685,797 | 8/1987 | Ito | 355/14 SH |
| 4,786,920 | 11/1988 | Igarashi | 346/134 |
| 4,792,858 | 12/1988 | Landsman | 358/497 |
| 5,008,714 | 4/1991 | Higashio | 355/313 |
| 5,126,860 | 6/1992 | Nagano | 358/471 |
| 5,140,443 | 8/1992 | Iwahara | 358/474 |
| 5,270,839 | 12/1993 | Paruski et al. | 358/474 |
| 5,270,841 | 12/1993 | Watanabe | 358/474 |
| 5,457,547 | 10/1995 | Yamada | 358/487 |
| 5,513,017 | 4/1996 | Knodt et al. | 358/471 |
| 5,574,274 | 11/1996 | Rubley et al. | 250/208.1 |

FOREIGN PATENT DOCUMENTS

60-33550  2/1985  Japan .

Primary Examiner—Madeleine Nguyen
Attorney, Agent, or Firm—Oblon, Spivak, McClelland, Maier & Neustadt, P.C.

[57] ABSTRACT

In an image forming apparatus, an image reading device has a first document setting section for setting a document, and a second document setting section included in an ADF (Automatic Document Feeder) which is capable of supporting and processing a document independently of the first document setting section. The second document setting section allows a number of documents to be stacked thereon. A switching device selectively causes either the document of the first document setting section or that of the second document setting section to be read. A control unit interrupts, when a read request requesting a first reading operation using the first document setting section is input while a second reading operation using the second document setting section is under way, the second reading operation, then executes the first reading operation, and then resumes the second reading operation after the first reading operation.

7 Claims, 7 Drawing Sheets

Fig. 11

IMAGE READING DEVICE HAVING TWO DOCUMENT SETTING SECTIONS

BACKGROUND OF THE INVENTION

The present invention relates to an image reading device for a copier, facsimile apparatus, printer or similar image forming apparatus and, more particularly, to an image reading device having two document setting sections and capable of reading documents laid on both of the two setting sections.

Japanese Patent Laid-Open Publication No. 60-33550, for example, discloses an image reading device for a copier and having a single reading section and two document setting sections sharing the reading section. When the device taught in this document is operated in a so-called interrupt copy mode, unoccupied one of the two document setting sections is used. Specifically, assume that a person desires to effect interrupt copying when the copier is reproducing a plurality of documents with an ADF (Automatic Document Feeder). Then, the person simply inserts desired documents one by one into an exclusive inlet independent of an ordinary document tray without regard to the paper transport timing or the copy timing of the copier body.

The above prior art image reading device achieves the expected effect so long as documents in the form of cut sheets are dealt with. However, when a person desires to copy, e.g., a book document, the person must open the ADF after carefully confirming the interruption of paper transport in the ADF because a single glass platen is shared by both the documents of the ADF and the book document. Careless handling of the ADF would result in critical troubles including the discontinuous pages of copies produced with the ADF. This increases the operator's burden and thereby causes the operator to sidestep the interrupt copying itself.

To meet the need for a space-saving configuration, a current trend in the imaging art is toward an ADF having a document setting or feeding section and a document discharging section which are stacked one upon the other in a reading section so as not to exceed the size of a glass platen. In this case, a book document or similar interrupt document cannot be copied unless all the documents are removed from the above sections of the ADF, and then the ADF is opened. This renders the interrupt copying function impractical.

SUMMARY OF THE INVENTION

It is therefore an object of the present invention to provide an image reading device for an image forming apparatus and capable of allowing, when a person is using an ADF, another person to surely and easily copy desired documents by interrupt copying without waiting the end of the ADF operation.

It is another object of the present invention to provide an image reading device for an image forming apparatus and having an extremely simple interrupt copying function which allows a person to repeat interrupt copying without any extra operation.

It is a further object of the present invention to provide an image reading device for an image forming apparatus and capable of automatically resuming, when a person executed interrupt copying forgets to cancel an interrupt request, a reading operation interrupted, thereby facilitating the interrupt copying procedure.

An image reading device of the present invention has a first document setting section for setting a document, and a second document setting section included in an ADF which is capable of supporting and processing a document independently of the first document setting section. The second document setting section allows a number of documents to be stacked thereon. A switching device selectively causes either the document of the first document setting section or that of the second document setting section to be read. A control unit interrupts, when a read request requesting a first reading operation using the first document setting section is input while a second reading operation using the second document setting section is under way, the second reading operation, then executes the first reading operation, and then resumes the second reading operation after the first reading operation.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
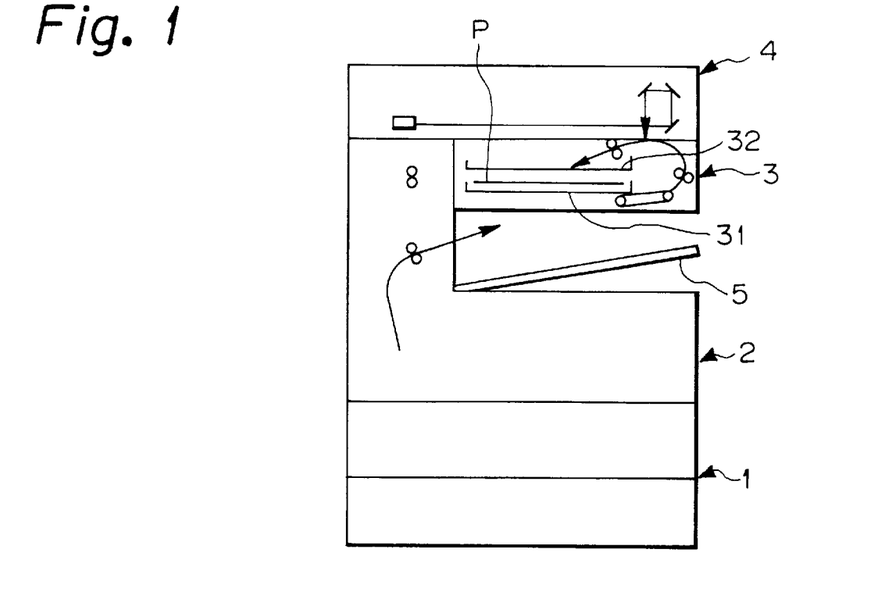
FIG. 1 shows an image forming apparatus to which preferred embodiments of the present invention are applicable and implemented as a digital copier.

Referring to FIG. 1 of the drawings, an image forming apparatus to which preferred embodiments of the present invention are applied are shown and implemented as a digital copier by way of example. As shown, the copier has a paper feeding section 1 arranged in a plurality of steps, an image forming section 2, an ADF 3, and an image reading device 4. These sections and devices are arranged one above the other, as illustrated. A copy tray 5 is positioned below the ADF 3 in order to stack papers, or copies, sequentially driven out of the image forming section 2. The ADF 3 has a feed section 31 for stacking documents P, and a discharge section 32 disposed above the feed section 31. The discharge section 32 receives the documents P sequentially driven out by way of a second glass platen which will be described. The ADF 3 can be bodily pulled out toward the operator, i.e., to the front with respect to the direction perpendicular to the sheet surface of FIG. 1.

Figure 2A:
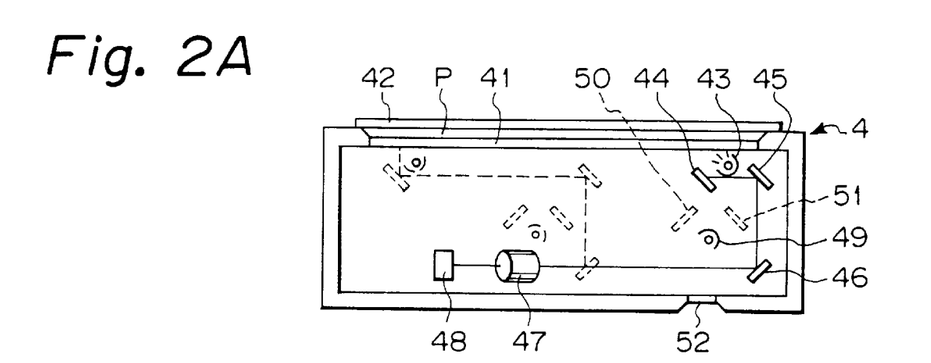
FIGS. 2A and 2B show an image forming device body included in the copier.
Figure 2B:
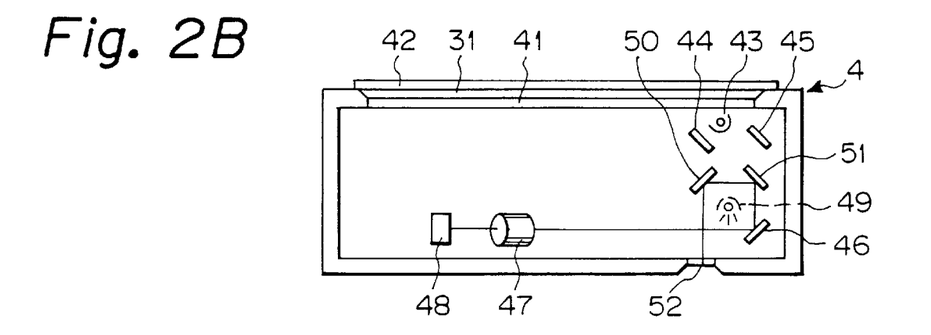

As shown in FIGS. 2A and 2B, a first glass platen 41 is mounted on the top of the image reading device 4 and allows the document P, which may even be a book document, to be laid thereon. The document P on the glass platen 41 is pressed by a cover plate 42 from the above. A first light source 43 illuminates the document P while being moved together with a first mirror 44, a second mirror 45, and a third mirror 46. The resulting reflection from the document P is incident to a CCD (Charge Coupled Device) image sensor 48 via the mirrors 44–46 and a lens 47. Such optics further includes a second light source 49, a first switching mirror 50, and a second switching mirror 51.

When the image reading device or scanner 4 reads the document P laid on the first glass platen 41, the second light source 49 and switching mirrors 50 and 51 are retracted from the optical path assigned to the document P (see FIG. 2A). On the other hand, when the scanner 4 reads the document P being conveyed from the feed section 31 of the ADF 3 toward the discharge section 32, the second light source 49 and switching mirrors 50 and 51 are fixed at their positions shown in FIG. 2B. In this condition, the scanner 4 reads the document P in transport. Hence, a second glass platen 52 located at the bottom of the scanner 4 needs a minimum of area. The glass platen 41 constitutes a first document setting section while the feed section 31 of the ADF 3 constitutes a second document setting section. Further, the first and second switching mirrors 50 and 51 constitute reading switching means for switching the reading section.

Figure 3:
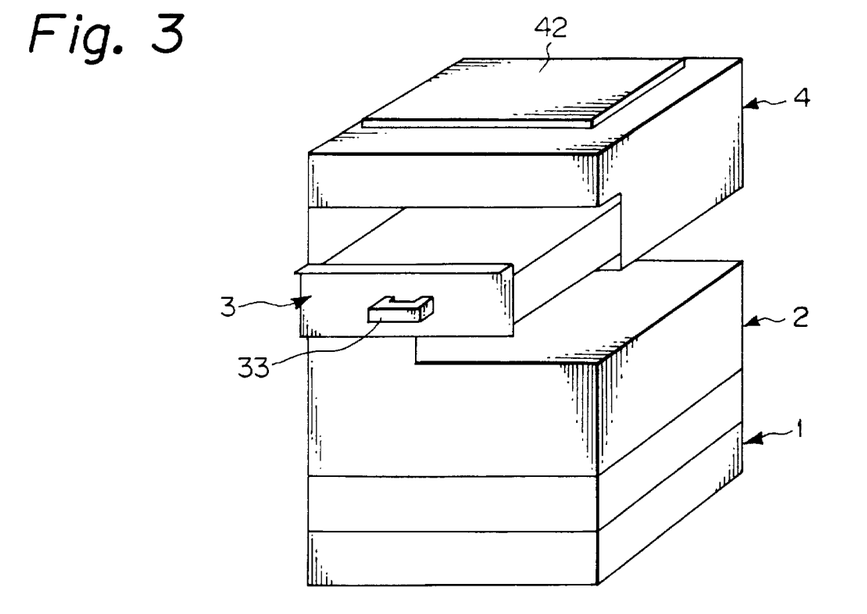
FIG. 3 is a perspective view of the copier from which an ADF is pulled out.

As shown in FIG. 3, the operator pulls out the entire ADF 3 toward the operator by holding a handle 33 and then stacks the documents P thereon. Because the documents P stacked o n the ADF 3 are transported along a path fully independent of the first glass platen 41, the stacking operation does not interfere with the glass platen 41.

Figure 4:
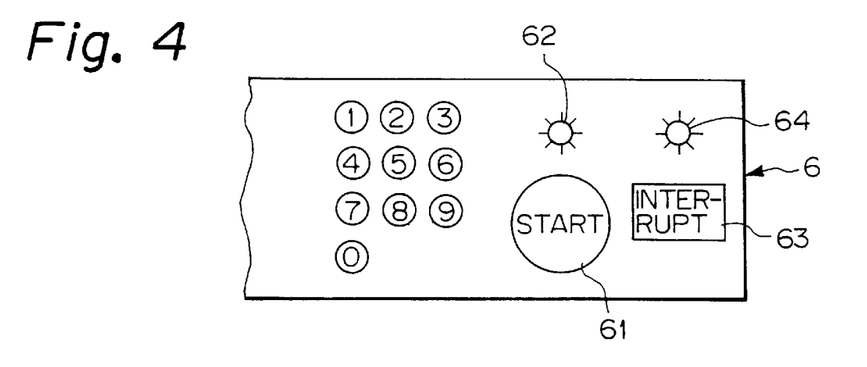
FIGS. 4 and 5 are fragmentary front views each showing a particular configuration of an operation and display panel included in the copier.
Figure 5:
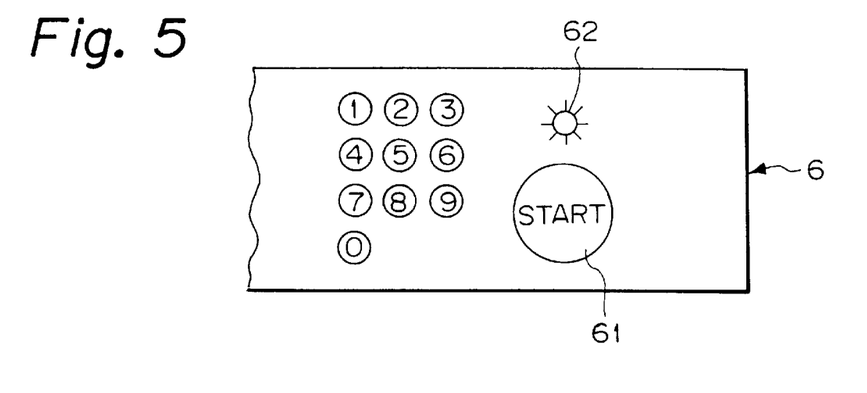

FIGS. 4 and 5 each shows a particular arrangement of an operation and display panel. In FIG. 4, the operation panel, labeled 6, has a start button 61, a ready LED (Light Emitting Diode; LED 1) 62, an interrupt button 63, and an interrupt LED (LED 2) 64. The LED 62 glows in green when the copier is ready to start operating or glows in red when it is not ready to do so. The LED 64 turns on (red) only when interrupt copying is effected. In FIG. 5, the interrupt button 63 is omitted; the ready LED 62 indicates a condition wherein the copier is ready to read a book document even when it i s reading the document P being transported in the ADF 3.

Figure 6:
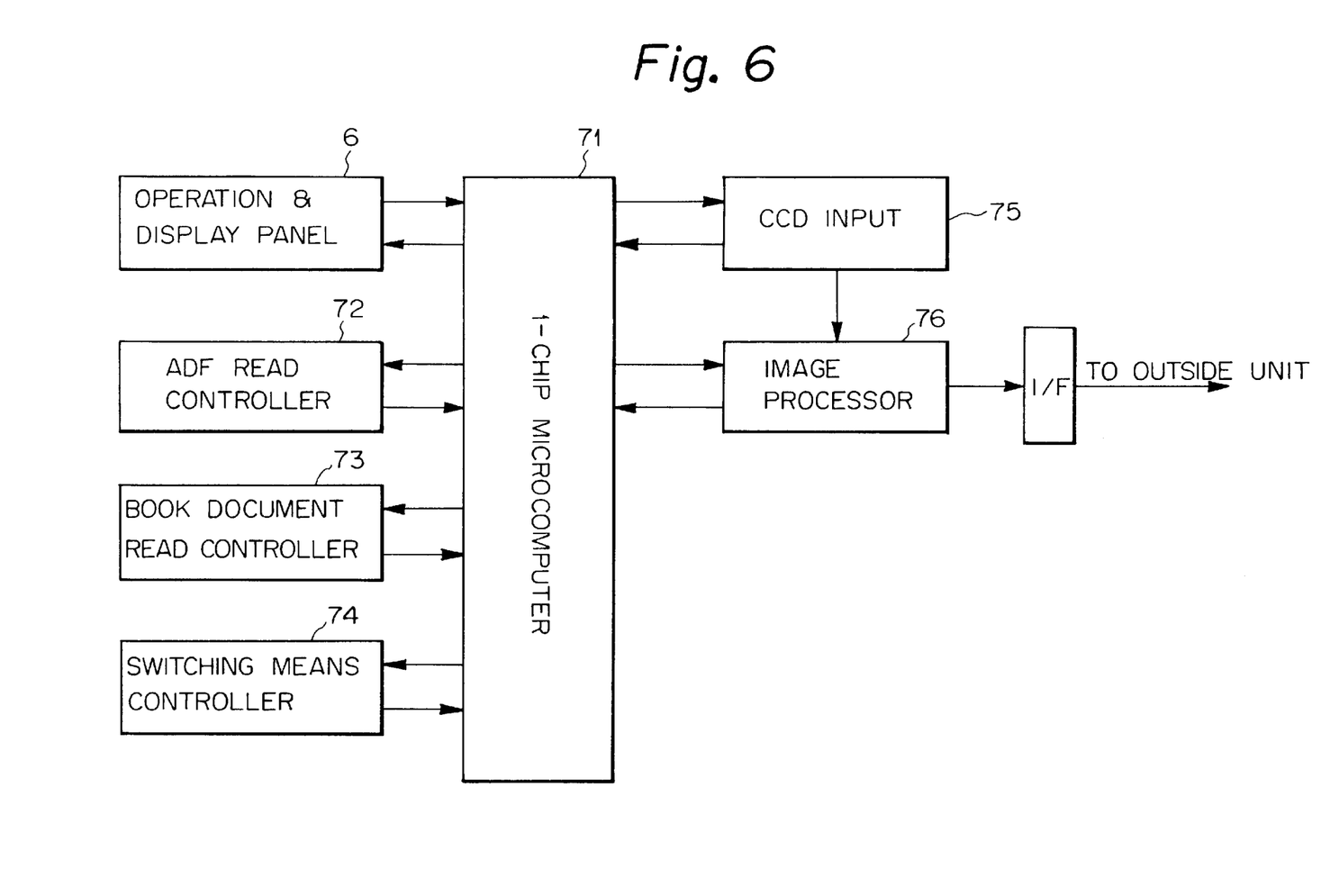
FIG. 6 is a block diagram schematically showing a control system incorporated in the copier.

FIG. 6 shows a part of a control system incorporated in the copier and relating to the present invention. As shown, the system includes a one-chip microcomputer 71. Connected to the microcomputer 71 are an ADF document read controller 72, a book document read controller 73, a switching means controller 74, a CCD input section 75, an image processor 76, and the operation and display panel 6. The ADF document read controller 72 controls the operation for reading the documents P stacked on the feed section, or second document setting section, of the ADF 3 (second reading operation). The book document read controller 73 controls the operation for reading a book document (although not limited to a book document) laid on the first glass platen 41, or first document setting section, (first reading operation).

Figure 7:
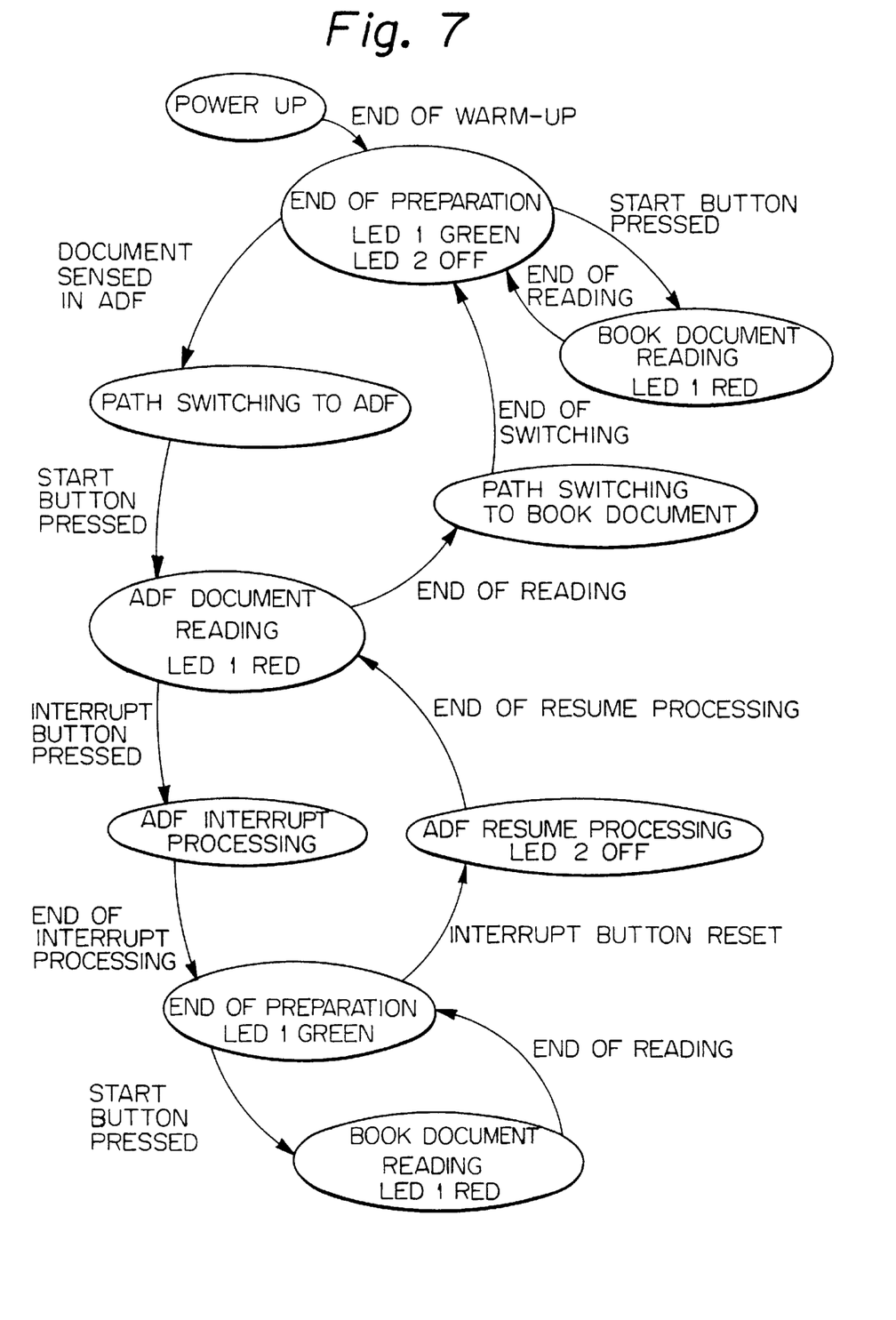
FIGS. 7–11 show the transitions of states respectively representative of a first embodiment to a fifth embodiment of the present invention.

A reading operation representative of a first embodiment of the present invention will be described with reference to FIGS. 4 and 7. This embodiment uses the operation and display panel 6 shown in FIG. 4. The interrupt copying function is added in order to allow a small number of urgent copies to be produced when a great number of copies are being produced by use of the ADF 3. Specifically, assume that the interrupt button 63 is pressed while the document reading operation using the ADF 3 is under way. Then, there is executed ADF interrupt processing for interrupting the document transport of the ADF 3 at a suitable time, and switching the switching means to the book document side. After a book document, for example, has been read, the interrupt button 63 is pressed again. As a result, the ADF 3 again starts transporting the documents P stacked thereon.

As stated above, the first embodiment has the first document setting section 41, and the second document setting section 31 included in the ADF 3 capable of accommodating the documents P and processing them independently of the first section 41. A great number of documents P may be stacked on the second document setting section, as desired. The switching means 50 and 51 is capable of causing either the document of the first setting section 41 or the document of the second setting section 31 to be read. When a read request requesting the first reading operation using the first setting section 41 is input during the second reading operation using the second setting section 31, the control means 71 interrupts the second reading operation, executes the first reading operation, and then resumes the second reading operation after the first reading operation. It has been customary with an ADF to read both of the two kinds of documents relating to an interrupt using a single glass platen. This brings about a problem that when a person sets a document or forgets to remove it while ADF interrupt processing or ADF resume processing is under way, the document jams the path of the ADF. This kind of jam needs a long period of time to be removed. The illustrative embodiment is free from this problem because the first and second setting sections 41 and 31 are independent of each other.

Figure 8:
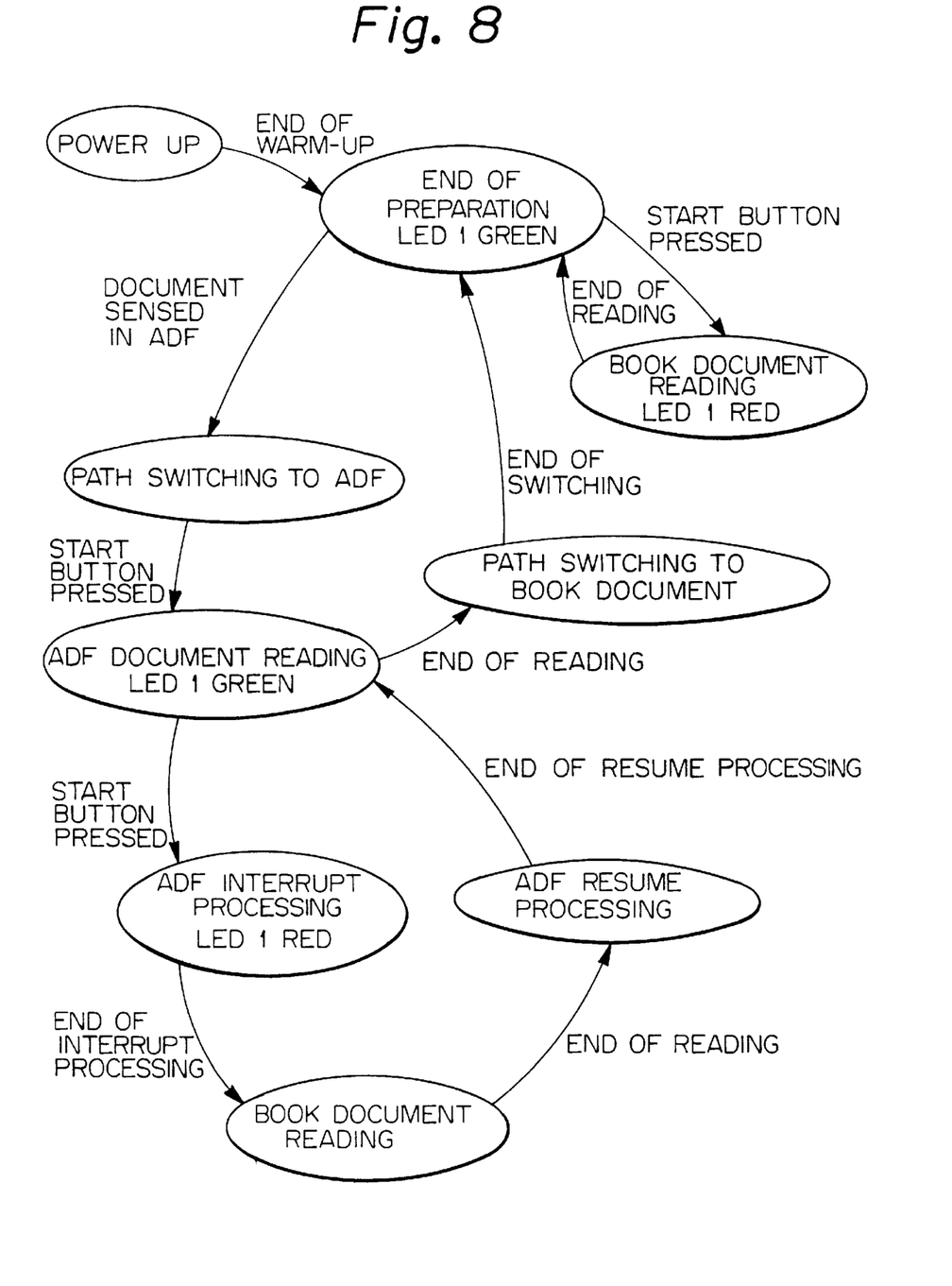

A reference will be made to FIGS. 5 and 8 for describing a second embodiment of the present invention. This embodiment uses the operation and display panel 6 shown in FIG. 5 and displays a condition wherein the copier is ready to read a book document any time even during the reading operation using the ADF 3. When the start button 61 is pressed, the embodiment executes the ADF interrupt processing, reads a book document, and then executes the ADF resume processing. In this manner, the document produces an interrupt copy without the operator being conscious of the interruption of the ADF reading and the following book reading.

In the second embodiment, whether the second reading operation be under way or not, the read request requesting the first reading operation using the first setting section 41 is generated by the same manipulation. A single reading section has heretofore been shared by the two kinds of documents. This forces the operator to perform an interrupt operation with the greatest care and renders the operation complicated. The illustrative embodiment obviates the need for knowledge relating to the interrupt procedure and promotes easy operation. In addition, the embodiment reduces the cost of the panel 6 and refines the appearance of the panel 6.

Figure 9:
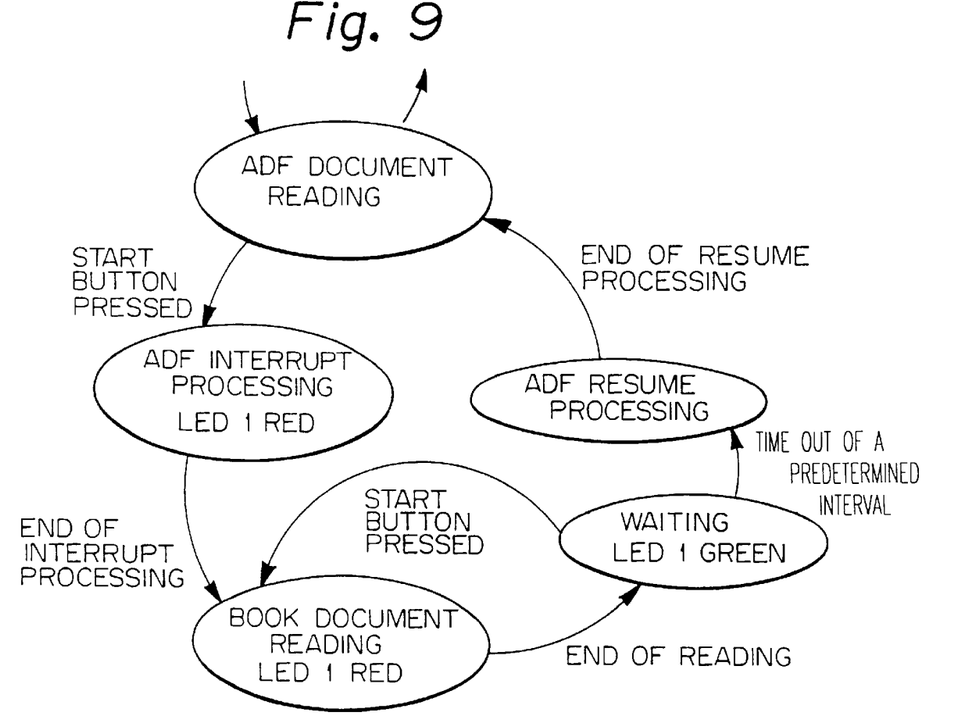

FIG. 9 demonstrates a reading operation representative of a third embodiment of the present invention. Assume that a book document is read over several pages thereof. Then, in the embodiment of FIG. 8, the cycle consisting of ADF interrupt processing, book reading and ADF resume processing occurs every time one page is read. By contrast, the third embodiment waits a period of time (predetermined interval) long enough for a person or operator to turn over the page and then press the start button 61. When the operator turns over the page and again presses the start button 61 within the above period of time, the embodiment reads the new page without interruption. Hence, the embodiment further promotes smooth interrupt reading.

As stated above, in the third embodiment, the control means 71 sets a predetermined interval to wait between the end of the first reading operation and the resumption of the second reading operation. When the read request requesting the first reading operation is again input during the above interval, the control means 71 maintains the interrupted state of the second reading operation. Stated another way, when the interrupt copying function is repeatedly used, the embodiment does not cancel the interrupt even after the interrupt reading has ended. This obviates waiting otherwise frequency occurring for the preparation for an interrupt and the cancellation thereof and thereby facilitates the operation of the copier.

Figure 10:
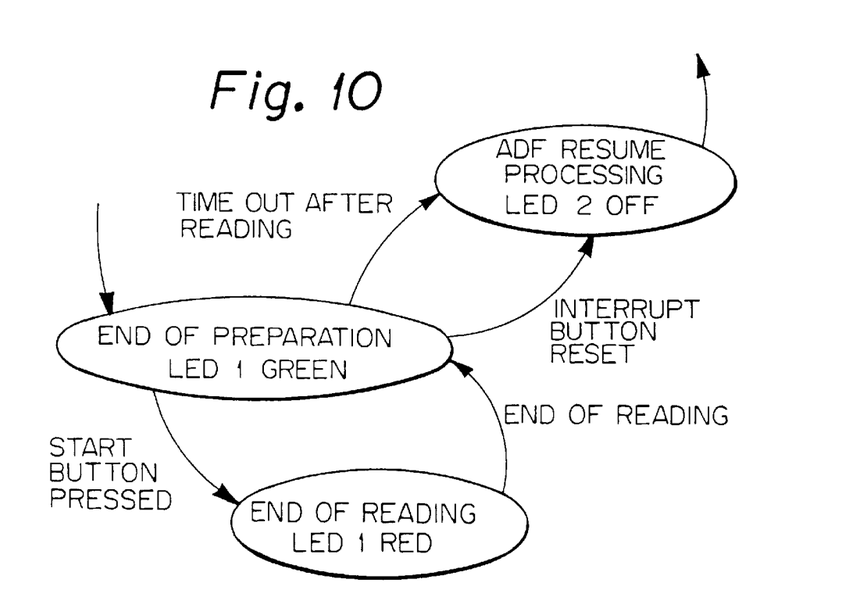

FIG. 10 shows an essential part of a reading operation representative of a fourth embodiment of the present invention. In the first embodiment of FIG. 7, the ADF 3 remains in the interrupted state unless the operator again presses, or resets, the interrupt button 63 after interrupt reading. By contrast, the fourth embodiment waits a period of time in which an operation for reading the next book document will presumably be started after the reading of the previous book document. When the above period of time elapses, the embodiment automatically resets the interrupt and thereby prevents the ADF 3 from being continuously held in the interrupted state.

As stated above, in the fourth embodiment, the control means 71 is capable of continuously generating the read request requesting the first reading operation, whether the first reading operation be executed or not, until the request has been cancelled. In addition, the embodiment automatically cancels the first reading operation when it has not been executed or cancelled for more than a preselected period of time. Hence, even when the operator forgets to cancel the interrupt request, the embodiment surely cancels it and thereby enhances the reliability of operation.

Figure 11:
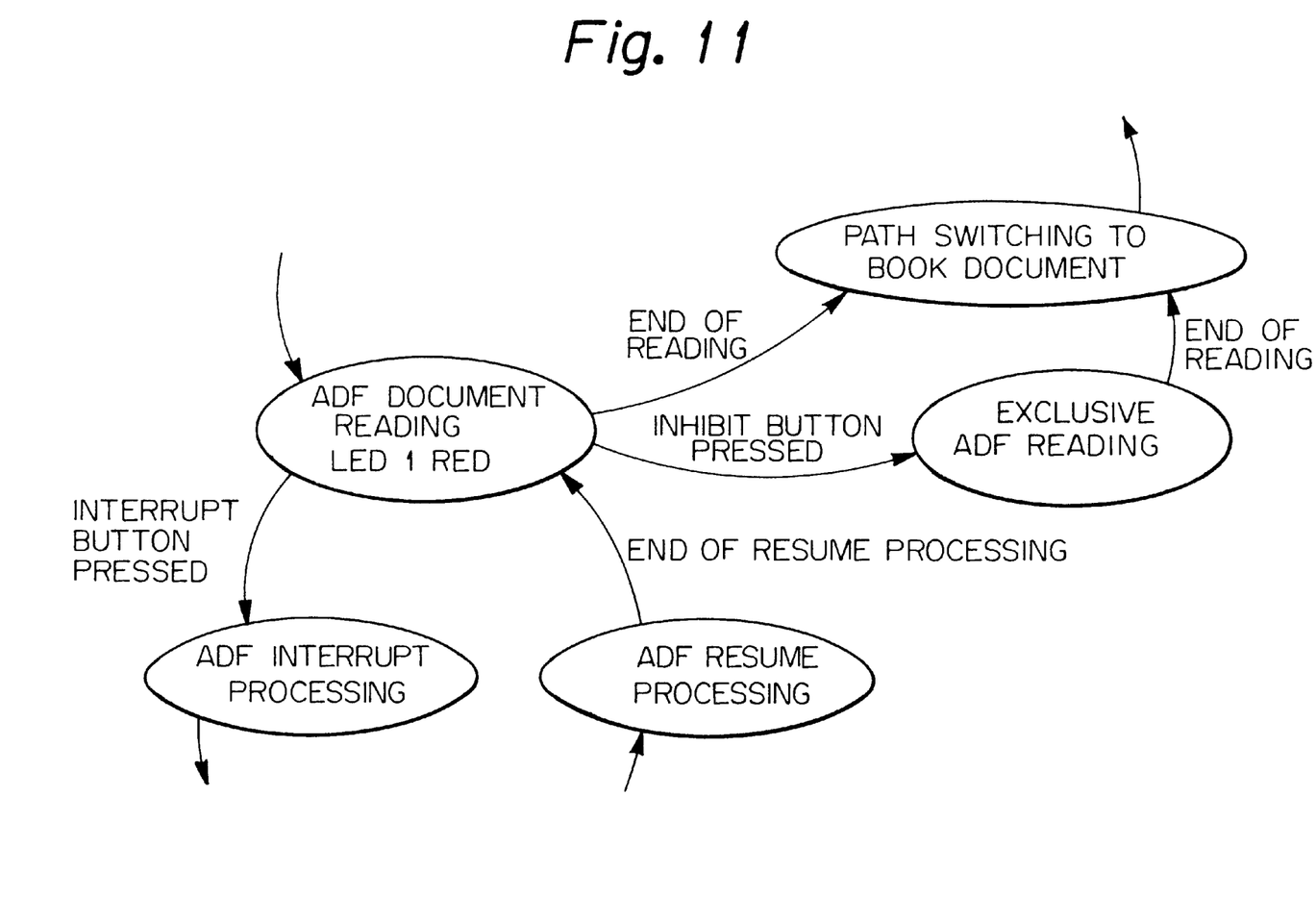

FIG. 11 shows an essential part of a reading operation representative of a fifth embodiment of the present invention. The interrupt copying function available with the above embodiments may be impedimental when the ADF reading should be rapidly completed; that is, the simple and easy interrupt copying function may bring about a problem ascribable to frequent interrupt. In light of this, the illustrative embodiment additionally includes an interrupt inhibit button, not shown. When this button is pressed, the embodiment inhibits an interrupt until the ADF reading completes.

As stated above, in the fifth embodiment, while the reading operation using the second reading section is under way, the reading operation using the first reading section can be inhibited. Hence, the apparatus capable of easily performing interrupt reading allows an interrupt inhibiting operation to be performed thereon. It follows that the ADF 3 can be continuously occupied for a series of documents stacked thereon.

In summary, it will be seen that the present invention provides an image reading device for an image forming apparatus and having the following unprecedented advantages.

(1) When a read request requesting a first reading operation using a first document setting section is input while a second reading operation using a second document setting section is under way, the second reading operation is interrupted, then the first reading operation is executed, and then the second reading operation is resumed. Hence, when a person intends to execute interrupt reading using the first document setting section, the person does not have to touch the documents of the second document setting section at all. This allows the person to execute the interrupt reading and the cancellation thereof surely and easily.

(2) When an interrupt copying function is repeatedly used, the device does not cancel the interrupt for a preselected period of time even after the interrupt reading has ended. This obviates frequent waiting otherwise occurring in the event of preparation for and cancellation of an interrupt and thereby facilitates the operation of the copier.

(3) The device capable of executing interrupt reading easily is provided with a preselected period of time relating to the input of an interrupt request. Hence, even when the operator forgets to cancel the interrupt request, the device can surely cancel the interrupt and thereby enhances reliability.

Various modifications will become possible for those skilled in the art after receiving the teachings of the present disclosure without departing from the scope thereof.

What is claimed is:

1. An image reading device comprising:
   a first document setting section for setting a document;
   a second document setting section included in an automatic document feeder which is capable of supporting and processing a document independently of said first document setting section, said second document setting section allowing a number of documents to be stacked thereon;
   switching means for selectively causing either the document of said first document setting section or the document of said second document setting section to be read; and
   control means for interrupting, when a read request requesting a first reading operation using said first document setting section is input while a second reading operation using said second document setting section is under way, said second reading operation, then executing said first reading operation, and then resuming said second reading operation after said first reading operation,
   wherein said switching means comprises a plurality of retractable mirrors and a retractable light source, and
   wherein said second document feeder included in the automatic document feeder is disposed below the first document setting section.

2. A device as claimed in claim 1, wherein said control means sets a preselected interval between an end of said first reading operation and a resumption of said second reading operation, and holds, when said read request is again input during said preselected interval, an interrupted state of said second reading operation.

3. A device as claimed in claim 1, wherein said control means is capable of continuously generating said read request, whether said first reading operation be executed or not, until said read request has been cancelled, and automatically cancels said first reading operation when said first reading operation has not been executed or cancelled for more than a preselected period of time.

4. An image reading device, comprising:
   a first transparent surface through which light passes to obtain a first image from a first document;
   a second transparent surface, different from the first transparent surface, through which light passes to obtain a second image from a second document;
   an illumination source including at least one retractable light source for illuminating at least one of said first transparent surface and said second transparent surface;
   an image sensing device;
   a plurality of optical devices which direct light from at least one of said first transparent surface and said second transparent surface towards the image sensing device;
   a control device which controls said plurality of optical devices corresponding to an entry by an operator of said image reading device, said control device configured to interrupt, when a read request requesting a first reading operation using said first transparent surface is input while a second reading operation using said second transparent surface is under way, said second reading operation, and then resuming said second reading operation after said first reading operation; and an automatic document feeder which feeds the second document to the second transparent surface, and which is below said second transparent surface.

5. A device as claimed in claim 4, wherein said illumination source comprises a first and second light sources.

6. A device as claimed in claim 4, wherein at least one of said plurality of optical devices comprises a moveable mirror.

7. A device as claimed in claim 4, wherein at least one of said plurality of optical devices comprises a retractable mirror.

* * * * *